(12) United States Patent
Lubnin

(10) Patent No.: US 8,722,764 B2
(45) Date of Patent: May 13, 2014

(54) NANOPARTICLE/VINYL POLYMER COMPOSITES

(75) Inventor: Alexander V. Lubnin, Copley, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 675 days.

(21) Appl. No.: 11/816,217

(22) PCT Filed: Mar. 16, 2006

(86) PCT No.: PCT/US2006/010079
§ 371 (c)(1),
(2), (4) Date: Aug. 14, 2007

(87) PCT Pub. No.: WO2006/099630
PCT Pub. Date: Sep. 21, 2006

(65) Prior Publication Data
US 2008/0153975 A1 Jun. 26, 2008

Related U.S. Application Data

(60) Provisional application No. 60/663,635, filed on Mar. 17, 2005.

(51) Int. Cl.
*C08L 23/06* (2006.01)
(52) U.S. Cl.
USPC ............................. 523/201; 524/585; 977/773

(58) Field of Classification Search
USPC .......... 524/445, 446–447, 186, 451; 526/128, 526/348; 501/141, 145; 427/404, 383.1, 427/385.5
See application file for complete search history.

(56) References Cited

U.S. PATENT DOCUMENTS

| | | | | | |
|---|---|---|---|---|---|
| 3,696,172 | A | * | 10/1972 | Kaiho et al. | 525/243 |
| 4,299,742 | A | * | 11/1981 | Belder et al. | 106/253 |
| 4,328,327 | A | * | 5/1982 | Tanaka et al. | 526/66 |
| 6,252,020 | B1 | * | 6/2001 | Kuo et al. | 526/128 |
| 7,078,276 | B1 | * | 7/2006 | Zurcher et al. | 438/151 |
| 2002/0055581 | A1 | * | 5/2002 | Lorah et al. | 524/445 |
| 2002/0058739 | A1 | * | 5/2002 | Lorah et al. | 524/445 |

FOREIGN PATENT DOCUMENTS

WO 0224756 A2 3/2002

OTHER PUBLICATIONS

"Dispersion and Alignment of Organic-Clay Composites within Polysilicate Think Films by the Sol-Gel Method." Chem. Mater. 1999, 11, 1089-1093.*
Cheremisinoff. "Bulk Polymerization." Handbook of Polymer Science and Technology: Synthesis and Properties, pp. 1-798, 1989.*

* cited by examiner

*Primary Examiner* — Doris Lee
(74) *Attorney, Agent, or Firm* — Samuel B. Laferty

(57) ABSTRACT

Vinyl polymers formed by bulk or solution polymerization techniques are combined with nanoparticles to produce aqueous dispersions of nanoparticle/vinyl polymer composites.

8 Claims, No Drawings

NANOPARTICLE/VINYL POLYMER COMPOSITES

CROSS REFERENCE

This application claims priority from PCT Application Serial No. PCT/US2006/010079 filed on Mar. 16, 2006, which claims the benefit of U.S. Provisional Application No. 60/663,635 filed on Mar. 17, 2005.

FIELD OF THE INVENTION

This invention relates to aqueous dispersions of nanoparticle/vinyl polymer composites.

BACKGROUND OF THE INVENTION

There has been some suggestion of making aqueous dispersions of nanoparticles and vinyl polymers. In one approach, such dispersions are "cold blended", i.e., they are made by mixing separately prepared aqueous dispersions of nanoparticles and aqueous dispersions of the vinyl and other polymers (e.g., U.S. Pat. Nos. 6,416,818 and 6,896,958). In another approach, the vinyl polymer is formed by emulsion polymerization in the presence of the nanoparticles (U.S. Pat. Nos. 6,765,049 and 6,759,463). Nonaqueous polymeric nanocomposites are also known (U.S. Pat. Nos. 6,306,502, 6,465,543 and 6,833,186).

SUMMARY OF THE INVENTION

Here, aqueous dispersions of nanoparticle/vinyl polymer composites, i.e., composite particles containing both nanoparticles and at least one vinyl polymer, are made by combining the nanoparticles with the polymer in the form of its bulk or solution polymerization reaction mass, i.e., the reaction mass in which the polymer is formed by bulk polymerization or solution polymerization.

In one embodiment, the nanoparticles are combined with the polymer before the bulk or solution polymerization mass is dispersed in aqueous medium. In this embodiment, the nanoparticle/vinyl polymer reaction mass can be dispersed in the aqueous medium before polymerization is completed, with completion of polymerization being accomplished in the aqueous medium. Additional monomers may also be added at this time. Alternatively, the nanoparticle/vinyl polymer reaction mass can be dispersed in the aqueous medium after polymerization is completed.

In another embodiment, the vinyl polymer bulk or solution polymerization reaction mass is dispersed in a previously-formed aqueous dispersion of nanoparticles. Other dispersed or dissolved polymers can also be present in the nanoparticle aqueous dispersion.

DETAILED DESCRIPTION

In accordance with the invention, an aqueous dispersion of vinyl polymer/nanoparticle composites, i.e., particles containing both nanoparticles and vinyl polymer, is prepared by combining the nanoparticles with the polymer in the form of its bulk or solution polymerization reaction mass, i.e., the reaction mass used to form the polymer by bulk polymerization or solution polymerization.

DEFINITIONS

Unless otherwise indicated, the following terms have the following meanings:

"Aqueous" and "aqueous medium" refer to compositions containing a substantial amount of water. They may contain other ingredients as well.

"Bulk polymerization" means the formation of polymer from substantially undiluted monomers. Incidental amounts of solvents, coalescents, plasticizers and/or water may also be present. Further description is given in "Bulk Polymerization", Vol. 2, pp. 500-514, *Encyclopedia of Polymer Science and Engineering,* ©1989, John Wiley & Sons, New York, the disclosure of which is incorporated herein by reference.

"Solution polymerization" means a polymerization technique in which both the monomers and resultant polymer are substantially soluble in a diluent (e.g., organic solvents, coalescents, plasticizers and/or water) that is also present. It is described in "Solution Polymerization", Vol. 15, pp. 402-418, *Encyclopedia of Polymer Science and Engineering,* ©1989, John Wiley & Sons, New York, the disclosure of which is incorporated herein by reference.

"Dispersion polymerization" means a polymerization technique in which polymerization of the monomers is at least initially carried out by bulk or solution polymerization, with the reaction system thereafter being emulsified or dispersed in an aqueous medium. It includes polymerization reactions in which polymerization is carried out to substantial or total completion before the bulk or solution polymerization system is dispersed in the aqueous medium.

"Emulsion polymerization" means a polymerization technique in which the monomers are emulsified in an aqueous medium containing a water-soluble initiator. Polymerization occurs predominantly in micelles formed by surfactant and not in the initially formed monomer droplets. The latter serve merely as a reservoir of monomers which diffuse out to find micelles and swell them. This mechanism produces polymer particles which are significantly smaller than original monomer droplets.

"Polymer" means a chemical substance consisting of one or more repeating units characterized by the sequence of one or more types of monomer units and comprising a simple weight majority of molecules containing at least 3 monomer units which are covalently bound to at least one other monomer unit or other reactant. Such molecules can be distributed over a range of molecular weights and can be characterized by number-average and/or weight-average molecular weights and polydispersity index.

"(Meth)acrylate" means either acrylate, methacrylate or both, while "(meth)acrylic" means either acrylic, methacrylic or both.

"Reaction mass in which the polymer is formed" and "reaction mass used to form the polymer by bulk polymerization or solution polymerization" refers to the bulk or solution polymerization reaction system in which the polymers of this invention are formed, whether before polymerization has begun, during polymerization or after polymerization has been completed. It is composed of the monomers being polymerized, other ingredients involved in the polymerization reaction such as initiators, catalysts, chain transfer agents and the like, as well as diluents normally included in solution polymerization systems such as solvents, coalescents and plasticizers.

"Substantial absence of surfactant" as well as "substantially free of residual surfactant" in reference to an aqueous dispersion of polymer particles means that the dispersion is made without intentionally including a surfactant for suspending or dispersing the polymer particles in the dispersion.

"Suspension polymerization" means a polymerization technique in which the monomers, normally together with an organic-soluble initiator, are first emulsified in an aqueous medium and thereafter the monomers are caused to polymerize. Because an organic-soluble initiator is used, polymerization occurs throughout the bodies of the emulsified monomer droplets rather than in micelles, as in the case of emulsion polymerization. The result is that the polymer particles formed are typically larger than the polymer particles formed by emulsion polymerization.

"Wt. %" means the number of parts by weight of monomer per 100 parts by weight of polymer, or the number of parts by weight of ingredient per 100 parts by weight of composition or material of which the ingredient forms a part.

Vinyl Polymers

The vinyl polymers of this invention are any polymer which can be formed by chain growth polymerization of ethylenically unsaturated monomers. Examples of such monomers include, but are not limited to, the following:

(i) Free-Radical Polymerizable Monomers

Examples of free radical polymerizable monomers which are useful in forming the vinyl polymers of this invention include acrylic esters, methacrylic esters, unsaturated nitriles, styrenic monomers, vinyl esters, vinyl ethers, conjugated dienes, olefins, halogenated, allyl and other monomers, and mixtures thereof.

Specific examples include acrylic esters and methacrylic acid esters having the formula I:

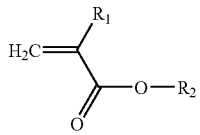

wherein $R_1$ is hydrogen or a methyl group, and $R_2$ contains about 1 to 100 carbon atoms, more typically 1 to 50 or 1 to 25 carbon atoms, and optionally, also one or more sulfur, nitrogen, phosphorus, silicon, halogen or oxygen atoms. Examples of suitable (meth)acrylate esters include methyl (meth)acrylate, ethyl(meth)acrylate, n-propyl(meth)acrylate, n-butyl(meth)acrylate, isopropyl(meth)acrylate, isobutyl (meth)acrylate, tert-butyl(meth)acrylate, n-amyl(meth)acrylate, n-hexyl(meth)acrylate, isoamyl(meth)acrylate, 2-hydroxyethyl(meth)acrylate, 2-hydroxypropyl(meth)acrylate, 4-hydroxybutyl(meth)acrylate, N,N-dimethylaminoethyl (meth)acrylate, N,N-diethylaminoethyl(meth)acrylate, t-butylaminoethyl(meth)acrylate, 2-sulfoethyl(meth)acrylate, trifluoroethyl(meth)acrylate, glycidyl(meth)acrylate, benzyl (meth)acrylate, allyl(meth)acrylate, 2-n-butoxyethyl(meth) acrylate, 2-chloroethyl(meth)acrylate, sec-butyl-(meth)acrylate, tert-butyl(meth)acrylate, 2-ethylbutyl(meth)acrylate, cinnamyl(meth)acrylate, crotyl(meth)acrylate, cyclohexyl (meth)acrylate, cyclopentyl(meth)acrylate, 2-ethoxyethyl (meth)acrylate, furfuryl(meth)acrylate, hexafluoroisopropyl (meth)acrylate, methallyl(meth)acrylate, 3-methoxybutyl (meth)acrylate, 2-methoxybutyl(meth)acrylate, 2-nitro-2-methylpropyl(meth)acrylate, n-octyl(meth)acrylate, 2-ethylhexyl(meth)acrylate, 2-phenoxyethyl(meth)acrylate, 2-phenylethyl(meth)acrylate, phenyl(meth)acrylate, propargyl(meth)acrylate, tetrahydrofurfuryl(meth)acrylate, nor-bornyl(meth)acrylate, acrylamide and its derivatives, and tetrahydropyranyl(meth)acrylate. Mixtures of acrylic and methacrylic acid esters may be used. The polymerized acrylic and methacrylic acid esters typically may comprise up to 100 wt. % of the vinyl polymer. Normally, they will comprise no more than 99, 98, 95 or 90 wt. % of the vinyl polymer.

Unsaturated nitrile monomers include acrylonitrile or an alkyl derivative thereof, the alkyl preferably having from 1 to 4 carbon atoms, such as acrylonitrile, methacrylonitrile, and the like. Also suitable are unsaturated monomers containing a cyano group such as those having the formula II:

$$CH_2=C(R)CO(O)CH_2CH_2CN \qquad (II)$$

wherein R is H or $C_nH_{2n+1}$ and n is 1 to 4 carbon atoms. Other examples of unsaturated nitrile monomers include $CH_2=C(CN)_2$, $CH_3-CH=CH-CN$, $NC-CH=CH-CN$, 4-pentenenitrile, 3-methyl-4-pentenenitrile, 5-hexenenitrile, 4-vinyl-benzonitrile, 4-allyl-benzonitrile, 4-vinyl-cyclohexanecarbonitrile, 4-cyanocyclohexene, and the like. Mixtures of the unsaturated nitriles may also be used. Acrylonitrile and methacrylonitrile are preferred. The polymerized unsaturated nitrile monomers typically may comprise no more than about 60 wt. %, more typically no more than 20%, 15 wt. %, 10 wt. %, 5 wt. % or 3 wt. % of the vinyl polymer.

The "styrenic monomers" useful in preparing the vinyl polymers of this invention may be defined as monomers containing a carbon-carbon double bond in alpha-position to an aromatic ring. The styrenic monomers may be represented by the following formulae:

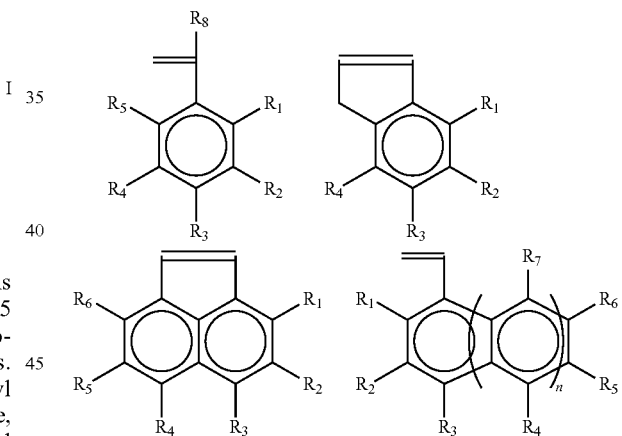

wherein n is an integer from 0 to 2; $R_1$, $R_2$, $R_3$, $R_4$, $R_5$, $R_6$, and $R_7$ are selected from the group consisting of H, $CH_3$, $C_mH_{2m+1}$, OH, $OCH_3$, $OC_mH_{2m+1}$ COOH, $COOCH_3$, $COOC_mH_{2m+1}$, Cl and Br, m is an integer from 2 to 9, and $R_8$ is selected from the group consisting of H, $CH_3$, $C_mH_{2+1}$, and $C_6H_5$.

Examples of suitable styrenic monomers include styrene, alpha-methylstyrene, tertiary butylstyrene, ortho, meta, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, indene and its derivatives, vinyl-naphthalene, diverse vinyl(alkyl-naphthalenes) and vinyl(halonaphthalenes) and mixtures thereof, acenaphthylene, diphenylethylene, and vinyl anthracene. Mixtures of styrenic monomers also may be used. Styrene and alpha-methylstyrene are preferred. The polymerized styrenic monomers typically may comprise no more than about 99 wt. %, more typically no more than 80%, 60 wt. %, 40 wt. %, 20 wt. %, 10 wt. % or 5 wt. % of the vinyl polymer.

Vinyl ester monomers derived from carboxylic acids containing 1 to 100, more typically 1 to 50 or 1 to 25, carbon atoms also may be useful in preparing the vinyl polymer of the present invention. Examples of such vinyl ester monomers include vinyl acetate, vinyl propionate, vinyl hexanoate, vinyl 2-ethylhexanoate, vinyl octanoate, vinyl pelargonate, vinyl caproate, neo esters of vinyl alcohol, vinyl laurate, and the like, as well as mixtures thereof. The polymerized vinyl ester monomers typically may comprise from 0 wt. % to about 99.5 wt. % of the vinyl polymer of the present invention.

Vinyl ethers may be useful in preparing the vinyl polymer of the present invention. Examples of vinyl ethers include methyl-, ethyl-, butyl, iso-butyl vinyl ethers and the like. The polymerized vinyl ether monomers typically may comprise from 0 wt. % to about 99 wt. %, preferably from 0 wt. % to about 50 wt. %, of the vinyl polymer of the present invention.

Conjugated diene monomers containing 4 to 12 carbon atoms, and preferably from 4 to 6 carbon atoms, also may be useful in preparing the vinyl polymer of the present invention. Examples of such conjugated diene monomers include butadiene, isoprene, cis-1,3-pentadiene, trans-1,3-pentadiene, cis-1,3-hexadiene, trans-1,3-hexadiene, 2-ethylbutadiene, 2-n-propylbutadiene, 2-1-propyl butadiene, 2-t-butylbutadiene, 2-amylbutadiene, 2-n-octylbutadiene, 4-methylpentadiene, cis-3-methylpentadiene, trans-3-methylpentadiene, cis-2-methylpentadiene, trans-2-methylpentadiene, 2,3-dimethylbutadiene, cis,cis-2,4-hexadiene, cis,trans-2,4-hexadiene, trans,trans-2,4-hexadiene, 2-methyl-3-ethylbutadiene, 2-methyl-3-1-propylbutadiene, 2-methyl-3-n-butylbutadiene, myrcene, cis-1-phenylbutadiene, trans-1-phenylbutadiene, 2-phenyl butadiene, 1,3-cyclopentadiene, 1,3-cyclohexadiene, 2-fluorobutadiene, 1-chlorobutadiene, 2-chlorobutadiene, 2,3-dichlorobutadiene, 2-bromobutadiene, sorbic acid, cis-1-cyanobutadiene, 2-methoxybutadiene and like, as well as mixtures thereof. Butadiene is more preferred. The polymerized conjugated diene monomers typically may comprise from 0 wt. % to about 99 wt. %, preferably from 0 wt. % to about 70 wt. %, of the vinyl polymer of the present invention.

Olefin monomers containing 2 to 100 carbon atoms, and preferably from 2 to about 10 carbon atoms, also may be useful in preparing the vinyl polymer of the present invention. Examples of such olefins include ethylene, propylene, butylenes, isobutylene, hexe-1-ene, oct-1-ene and like, as well as mixtures thereof. Cyclic olefins may also be used such as vinyl cyclohexane, cyclopentene, cyclohexene, cyclooctadiene, norbornene, norbornadiene, pinene and like. The polymerized olefins typically may comprise from 0 wt. % to about 99 wt. %, from 0 wt. % to about 70 wt. %, from 0 wt. % to about 30 wt. %, or from 0 wt. % to about 10 wt. %, of the vinyl polymer of the present invention.

Apart from halogen-containing monomers mentioned above, other fluorine, chlorine, bromine, and iodine-containing monomers also may be useful in preparing the vinyl polymer of the present invention. They may contain 2 to 100 carbon atoms and at least one halogen atom. Examples of such monomers include vinyl fluoride, vinyl chloride, vinyl bromide, vinylidene fluoride, vinylidene chloride, halogenated (meth)acrylic and styrenic monomers, allyl chloride and like, as well as mixtures thereof. They typically may comprise from 0 wt. % to about 99 wt. %, from 0 wt. % to about 80 wt. %, from 0 wt. % to about 50 wt. %, or from 0 wt. % to about 30 wt. %, of the vinyl polymer of the present invention.

(ii) Polar Monomers

Another group of monomers which are useful in preparing the vinyl polymers of the present invention are polar monomers such as hydroxyalkyl(meth)acrylates, (meth)acrylamides and substituted (meth)acrylamides, sodium styrene sulfonate and sodium vinyl sulfonate, N-vinyl-2-pyrrolidone, N-vinyl caprolactam, 2-hydroxyethyl(meth)acrylate, 2-hydroxypropyl(meth)acrylate, 4-hydroxybutyl(meth)acrylate, (4-hydroxymethylcyclohexyl)-methyl(meth)acrylate, acrolein, diacetone(meth)acrylamide, 1-(2-((2-hydroxy-3-(2-propenyloxy)propyl)amino)ethyl)-2-imidazolidinone, N-methylol(meth)acrylamide, diallyl phthalate, Sipomer® WAM and WAM II (from Rhodia), dimethylaminoethyl (meth)acrylate, and dimethylaminopropyl(meth)acrylamide. Mixtures of polar monomers also may be used. The polymerized polar monomers typically may comprise no more than about 50 wt. %, more typically no more than about 40 wt. %, 30 wt. %, 20 wt. %, 10 wt. %, or even 5 wt. % of the vinyl polymer of the present invention. When used, they are normally present in amounts of about 1 wt. % or more, more typically about 2 wt. %, 3 wt. %, 4 wt. %, 6 wt. %, 8 wt. % or 10 wt. % or more.

(iii) Water-Dispersability Enhancing Compounds

Vinyl polymers are generally hydrophobic and not water-dispersible. In accordance with one embodiment of the invention, therefore, a water-dispersability enhancing compounds (I.e., monomers, chain transfer agents, initiators) have at least one hydrophilic, ionic or potentially ionic group is optionally included in the polymer to assist dispersion of the polymer, thereby enhancing the stability of the dispersions so made. Typically, this is done by incorporating a compound bearing at least one hydrophilic group or a group that can be made hydrophilic (e.g., by chemical modifications such as neutralization or deblocking) into the polymer chain. These compounds may be of a nonionic, anionic, cationic or zwitterionic nature or the combination thereof.

For example, anionic groups such as carboxylate, sulfate, sulfonate, phosphate, and phosphonate can be incorporated into the polymer in an inactive form and subsequently activated by a salt-forming compound, such as ammonia, organic amines and alkali metal hydroxides. Other water-dispersability enhancing compounds can also be reacted into the polymer backbone, including lateral or terminal hydrophilic ethylene oxide, pyrrolidone or ureido units.

Water dispersability enhancing compounds of particular interest are those which can incorporate acid groups into the polymer such as ethylenically unsaturated monomers having at least one carboxylic acid group, and preferably one or two carboxylic acid groups. Examples of such monomers include acrylic acid, methacrylic acid, itaconic acid, maleic acid, maleic anhydride, fumaric acid, crotonic acid, vinyl acetic acid, mesaconic acid, citraconic acid, 2-acrylamido-2-methylpropanesulfonic acid, styrene sulfonic acid, 2-sulfoethyl (meth)acrylate, alkali metal salts of the above acids and amine or ammonium salts thereof such as sodium allyl sulfonate, sodium 1-allyloxy-2-hydroxypropane sulfonate (COPS 1), 2-acrylamido-2-methyl propane sulfonate (AMPS), sodium dodecyl allyl sulfosuccinate (TREM-LF40), sodium methallyl sulfonate, sodium styrene sulfonate, sodium vinyl sulfonate, sodium vinyl phosphonate, sodium sulfoethyl methacrylate. Acrylic acid and methacrylic acid are preferred. The polymerized ethylenically unsaturated monomers having at least one acid group typically may comprise no more than about 50 wt. %, more typically no more than about 40 wt. %, 30 wt. %, 20 wt. %, 10 wt. %, 9 wt. %, 8 wt. % or even 5 wt. % of the vinyl polymer of the present invention. When used, they are normally present in amounts of about 1 wt. % or more, more typically about 2 wt. %, 3 wt. %, 4 wt. %, 5 wt. % 6 wt. %, 7 wt. %, 8 wt. %, 9 wt. % or 10 wt. % or more.

Another group of water dispersability enhancing compounds are the reactive macromers of alkylene oxides having at least one functional group capable of free-radical transformation. Such macromers, which are well known in the prior art, have the formula

$$X—(Y—O)_n—Z \quad (IV)$$

wherein Y is a straight or branched chain alkyl radical having 1 to 6 carbon atoms, preferably 2 to 4 carbon atoms, X is a functional group capable of free-radical transformation, such as acrylate, which may be represented by the formula $H_2C=CHC(O)O—$, methacrylate, which may be represented by the formula $H_2C=C(CH_3)C(O)O—$, allyl ether, which may be represented by the formula $H_2C=CHCH_2O—$, vinyl ether, which may be represented by the formula $H_2C=CHO—$, vinylbenzyl, vinylsulfonic ester, which may be represented by the formula $H_2C=CHSO_3—$, or mercaptan, Z is H, $C_mH_{2m+1}$, phosphate, or the same as X, and m is 1 to 8, preferably 1 to 3. "n" may vary to achieve the desired molecular weight (number average) set forth below. Z is preferably H or methyl. X is preferably acrylate or methacrylate. Examples of suitable reactive monomers include methoxy polyethylene oxide(meth)acrylate (also known as methoxypolyethylene glycol methacrylate or "MePEGMA"), methoxy polyethylene oxide allyl ether, polyethylene oxide allyl ether, butoxy polyethylene oxide (meth)acrylate, p-vinylbenzyl terminated polyethylene oxide, polyethylene oxide di(meth)acrylate, polyethylene oxide thiol, polyethylene oxide maleimide, polyethylene oxide vinylsulfone, ethyl triglycol methacrylate, and the like. Mixtures of the reactive macromers may also be used. Preferred reactive macromers include methoxy polyethylene oxide(meth)acrylate, methoxy polyethylene oxide allyl ether, and polyethylene oxide allyl ether. Suitable reactive macromers may have molecular weights (number average) from about 100 to about 10,000, preferably from about 100 to about 5,000, and more preferably from about 300 to about 2,000. The alkylene oxide-containing macromers, typically may comprise no more than about 70 wt. %, more typically no more than about 50 wt. %, 40 wt. % 30 wt. %, 20 wt. %, 10 wt. %, 9 wt. %, 8 wt. %, 5 wt. % or even 3 wt. % of the vinyl polymer of the present invention. When used, they are normally present in amounts of about 1 wt. % or more, more typically about 2 wt. %, 3 wt. %, 4 wt. %, 5 wt. % 6 wt. %, 7 wt. %, 8 wt. %, 9 wt. %, 10 wt. %, 12 wt. %, 15 wt. %, 18 wt. %, 20 wt. %, 25 wt. %, 30 wt. %, 35 wt. % or more.

Hydrophilic or potentially hydrophilic groups may also be introduced into the polymer by the use of chain transfer agents such as 3-mercaptopropanoic acid, PEG thiols and like and mixtures thereof.

(iv) Compounds Having at Least One Crosslinkable Functional Group

Compounds having at least one crosslinkable functional group can also be incorporated into the vinyl polymers of the present invention, if desired. Examples of such compounds include N-methylol acrylamide (NMA), diacetone aclylamide (DAAM), acetoacetoxy ethyl methacrylate (AAEM), epoxy-containing compounds, —OH containing compounds, —COOH containing compounds, isocyanate-containing compounds (TMI), mercaptan-containing compounds, compounds containing olefinic unsaturation and the like. Mixtures can also be used.

(v) Catalysts

Any compound capable of generating free radicals under the reaction conditions employed can be used as catalysts for vinyl polymer formation in this invention. In this regard, see, "Initiators", Vol. 13, pp. 355-373, Kirk-Othmer, *Encyclopedia of Chemical Technology*, ©1981, John Wiley & Sons, New York., the disclosure of which is incorporated herein by reference. Anionic, cationic and coordination polymerization catalysts as well as various energy sources such as UV, EB, IR, X-ray can also be used.

Nanoparticles

Any type of nanoparticles can be used in preparing the inventive dispersions. For example, metal oxides, metal hydroxides, metal salts, clusters, nanoelements such as nanometals and their alloys, polymers, waxes, and so forth can be used. Specific examples include silica, alumina, ceria, zinc oxide, copper oxide, iron oxide, nickel oxide, manganese oxide, silicon carbide, silicon nitride, tin oxide, titania, tungsten oxide, yttria, zirconia, complex oxides such as zinc ferrite, magnesium ferrite, aluminum silicate and barium carbonate, various metal carbides such as titanium carbide, metal hydroxides such as aluminum hydroxide, magnesium hydroxide, manganese hydroxide and cerium hydroxide, naturally-occurring and synthetic materials such as clays and talcs, as well as organic abrasives such as polystyrene, urea-formaldehyde and latex particles. Mixtures of these nanoparticles can also be used. Silica, alumina, titania, ceria, clays and talcs and mixtures thereof are most often used. Composite nanoparticles in which individual particles are comprised of two or more components can also be used. Examples include core-shell, multiple core-shell and other architectures. Some methods for preparation and treatment of nanoparticles are described in U.S. Pat. Nos. 5,460,701; 5,514, 349; 5,874,684; 5,993,967; 6,033,781; and 6,669,823.

Nanoparticles can also be formed in situ in one or more starting materials, in the prepolymer and/or in dispersion from a precursor. For example, silica can be formed as a result of hydrolysis of tetraethoxysilane (TEOS). If the hydrolysis is to be induced, sufficient amount of water needs to be added to accomplish full or partial conversion of TEOS into silica. Other examples of precursors include $Ti(OiPr)_4$, $Al(OiPr)_3$, and alike. The conversion of precursors into particles is also known as the sol-gel process.

Yet, another method of in situ nanoparticle generation is overbasing of organic fluids.

These nanoparticles can be either untreated (i.e., used as received from the supplier) or surface treated to add various functionalities and/or effects. In this connection, it is well known that the particulate fillers can be surface treated with a wide variety of chemicals and/or treatments to affect particle chemistry and performance. Some surface treatments involve physical adsorption of the chemical on the particle surfaces, while in other instances the chemical can be covalently or ionically bonded to the particle surfaces. Also, the surface treating agent can be unreactive in the sense that it does not contain a functional group capable of reacting with other ingredients present, as for example in the case of a surfactant or dispersant. Alternatively, the surface treating agent can include a reactive group capable of reacting with other ingredients present. Silane-containing coupling agents are a good example.

The particle size of the nanoparticles can vary widely, and essentially any particle size in the nanoparticle size range can be used. In general, the mean particle size of the particles, $D_{50}$ as determined by laser light scattering (e.g., by using a Malvern Mastersizer laser-based particle size measuring instrument), may be as large as 10 microns but will normally be less than 1 micron. Particles having a mean particle size of about 500 nm or less, more typically 250 nm or less, or even 100 nm or less are interesting. In other embodiments, the mean particle size will be 50 nm or less, 25 nm or less, or even 10 nm or less. In some embodiments, the particle size may even be as low as 5 nm or less, 2 nm or less, or even 1 nm or less.

Particle size can also be characterized by particle size distribution, since all particles in a batch of particles do not have an identical particle size. Thus, in some embodiments of the invention, it is desirable that the nanoparticle batch have a $D_{90}$ of less than 1 micron (i.e., 90% of the particles in the batch by number have diameters less than 1 micron). Nanoparticle batches with Dgo's of 600 nm or less, 500 nm or less, 200 nm or less, 100 nm or less, 50 nm or less, 10 nm or less and even 1 nm or less, are especially interesting.

Of particular interest are nanoparticle batches having $D_{90}$'s of 100 nm or less, since nanoparticles of this size when distributed in a polymer matrix become translucent to transparent to the naked eye.

The concentration of nanoparticles in the vinyl polymers of the present invention can also vary widely, and essentially any amount can also be used. Typically, this means the polymer will contain no more than about 75 wt. %, more typically no more than about 50 wt. %, 40 wt. % 30 wt. %, 20 wt. %, 15 wt. %, 12 wt. %, 10 wt. %, 9 wt. %, 8 wt. %, 7 wt. %, 6 wt. %, 5 wt. %, 4 wt. % or even 3 wt. % of the vinyl polymer of the present invention. When used, they are normally present in amounts of about 1 wt. % or more, more typically about 2 wt. %, 3 wt. %, 4 wt. %, 5 wt. % 6 wt. %, 7 wt. %, 8 wt. %, 9 wt. %, 10 wt. %, 12 wt. %, 15 wt. %, 18 wt. %, 20 wt. %, 25 wt. %, 30 wt. %, 35 wt. % or more.

Solution or Bulk Polymerization

In accordance with the invention, an aqueous dispersion of vinyl polymer/nanoparticle composites, i.e., particles containing both nanoparticles and vinyl polymer, is prepared by combining the nanoparticles with the polymer in the form of its bulk or solution polymerization reaction mass, i.e., the reaction mass used to form the polymer by bulk polymerization or solution polymerization. In other words, bulk or solution polymerization techniques are used for forming the polymer of the inventive aqueous dispersion rather than the emulsion polymerization techniques used in earlier technology.

As understood in the art, the chemistry of dispersed vinyl polymers which include a copolymerized water-dispersability enhancing compound (e.g., acrylic acid, methacrylic acid or other acid monomer) is different depending on how the polymer is made. If the polymer is made by emulsion polymerization techniques, the acid monomer tends to reside at the micelle/water interface since it is soluble in the aqueous phase. As a result, the polymer particles formed are composed of a body section containing all of the other monomers present, in copolymerized form, and a surface section composed of minute "hairs" of the acid monomer essentially in homopolymer form. In a polymer made by bulk or solution polymerization techniques, however, due to the essentially homogeneous nature of polymerization, the hydrophilic monomers do not segregate from the other monomers but rather all monomers copolymerize essentially randomly according to their reactivity ratios. Therefore, the dispersed particles which are formed have an essentially homogenous or uniform structure throughout the bulk of the particle. In accordance with this invention, bulk or solution polymerization techniques are used to form the polymer of the nanoparticle/vinyl polymer aqueous dispersions ultimately produced. As a result, the nanoparticle/vinyl composite particles obtained are structurally different from those made by earlier technology in which the monomers were emulsion polymerized in the presence of the nanoparticles.

Techniques for bulk polymerizing and solution polymerizing ethylenically unsaturated monomers are well known in the prior art and described, for example, in the above-noted Kirk-Othmer articles. See, also, "Initiators," Vol. 13, pp. 355-373, Kirk-Othmer, *Encyclopedia of Chemical Technology*, © 1981, John Wiley & Sons, New York, the disclosures of which is also incorporated herein by reference. Any such technique can be used in making the vinyl polymers of this invention.

Where solution polymerization is used, water can be present in the solution polymerization reaction mass in accordance with well known technology, as it may aid in dissolution of some of the monomers and polymers in the system. For example, azeotropes of water in isopropyl alcohol serve as effective solvents for solvent polymerization. If water is present, the amount of water used should be kept below the amount which would convert the system to an emulsion polymerization regimen. Although the water can be used as sole solvent or virtually absent from the system, the amount of water in the system should normally not exceed more than about 75 wt. % based on the weight of liquid diluents in the system, more typically no more than about 50 wt. %, 40 wt. % 30 wt. %, 20 wt. %, 15 wt. %, 12 wt. %, 10 wt. %, 9 wt. %, 8 wt. %, 7 wt. %, 6 wt. %, 5 wt. %, 4 wt. % or even 3 wt. % based on the weight of liquid diluents in the system. When used, water is normally present in amounts of about 1 wt. % or more, more typically about 2 wt. %, 3 wt. %, 4 wt. %, 5 wt. % 6 wt. %, 7 wt. %, 8 wt. %, 9 wt. %, 10 wt. %, 12 wt. %, 15 wt. %, 18 wt. %, 20 wt. %, 25 wt. %, 30 wt. %, 35 wt. % or more. Solution (and bulk) polymerization can be accomplished in the substantial absence of water.

Combining Polymer and Nanoparticles Before Dispersion in Water

In one embodiment of the invention, the nanoparticles are combined with the vinyl polymer's bulk or solution polymerization reaction mass prior to dispersing the reaction mass in aqueous medium.

(i) Combining the Nanoparticles and Polymer Reaction Mass

Combining the nanoparticles with the polymer reaction mass can be done in any way. For example, the nanoparticles can be combined with one of the ingredients forming the polymer, e.g., the free radical polymerizable monomer, the polar monomer and/or the water-dispersability enhancing monomer, before they are combined to form the bulk or solution polymerization reaction mass. Alternatively, the nanoparticles can be combined with the bulk or solution polymerization reaction mass at any time during the bulk or solution polymerization reaction. The nanoparticles can also be combined with the bulk or solution polymerization reaction mass after polymerization is substantially or even totally completed, if desired. Regardless of the particular procedure employed, the nanoparticles should be combined with the bulk or solution polymerization reaction mass so that a blend or mixture, preferably an intimate admixture, of the reaction mass and the nanoparticles is formed before the mixture is dispersed in water.

Also, where solution polymerization techniques are employed, some or all of the solvent can be removed before the reaction system is dispersed in water, or even before the reaction system is combined with the nanoparticles, if desired.

(ii) Dispersing the Reaction Mass in Water

Once the nanoparticles are combined with the bulk or solution polymerization reaction mass, the mixture so formed is dispersed in an aqueous medium to form a dispersion of the mixture. This can be done by any conventional technique, in the same way that other vinyl polymers made by bulk or solution polymerization are dispersed in water. Normally, this is done by combining the nanoparticle/polymer blend with the aqueous medium with mixing. If desired, the solvent used for solution polymerization can also be partially or completely removed, before or after this dispersing step.

Because the nanoparticles are combined with the polymer in the bulk or solution polymerization reaction, the individual nanoparticle/polymer composite particles that are formed upon dispersion in water are composed of an intimate mixture of nanoparticles and the polymer. Separately dispersed nanoparticles are normally avoided. The result is that the aqueous dispersions obtained are substantially free, preferably essentially completely free, of separately dispersed nanoparticles, i.e., nanoparticles uncombined with polymer.

Dispersing the nanoparticle/vinyl polymer reaction mass in the aqueous medium will normally be done after polymerization is completed. However, it can also be done before polymerization is completed, with completion of polymerization being accomplished in the aqueous medium. If so, polymerization should normally be at least 20% complete before dispersion. More typically, polymerization will be 50, 75, 85, 90, 95 or even 99% complete before dispersion. In either case, however, the nanoparticles are combined with the reaction mass in which the polymer is formed prior to dispersing the reaction mass in water. The result is that a substantial portion of the polymer, whether wholly or partially formed, is in the form of nanoparticle/polymer composites, i.e., discrete particles containing both vinyl polymer and nanoparticles.

(iii) Polymerization in Dispersed Phase

Where the nanoparticle/vinyl polymer reaction mass is dispersed in aqueous medium before polymerization is completed, completion of polymerization can then be done by any technique which will accomplish polymerization of ethylenically unsaturated monomers dispersed in water, which techniques are very well known in the art. See, for example, Lovell and Aaser, *Emulsion Polymerization and Emulsion Polymers*, J. Wiley & Sons (1997), which describes various free radical polymerization methods well known to those skilled in the art. Additional monomers may also be added to the system at this time, i.e., after dispersion, in accordance with known technology.

Combining the Polymer with an Aqueous Nanoparticle Dispersion

In another embodiment of the invention, the vinyl polymer bulk or solution polymerization reaction mass is dispersed in a previously-formed aqueous dispersion of nanoparticles. Although the product vinyl polymer/nanoparticle dispersions produced in this way may contain at least some independently dispersed nanoparticles (i.e., dispersed particles essentially free of vinyl polymer), they nonetheless will contain significant concentrations of vinyl polymer/nanoparticle composite particles in accordance with this invention.

When this approach is used, the bulk or solution polymerization reaction mass can be dispersed in the aqueous nanoparticle dispersion after polymerization of the vinyl polymer is essentially completed. Alternatively, the reaction mass can be dispersed in the aqueous nanoparticle dispersion before polymerization is completed, with completion of polymerization being accomplished in the aqueous nanoparticle dispersion. If so, polymerization should normally be at least 20% complete, more typically 50, 75, 85, 90, 95 or even 99% complete, before dispersion.

Additional monomers can also be added to such aqueous nanoparticle dispersions, if desired. In addition, other dispersed and dissolved polymers and oligomers can also be present in and/or added to such nanoparticle aqueous dispersions.

Dispersions Substantially Free of Emulsifiers (i) Water-dispersability Enhancing Compounds In particular embodiments of the invention, where the polymer includes enough water-dispersability enhancing compound to form a stable dispersion without added emulsifiers (surfactants), the vinyl polymer/nanoparticle aqueous dispersion of this invention can be made without such emulsifiers (surfactants). That is, the dispersion can be formulated substantially free of surfactants. In addition, it can also be formulated substantially free of coalescents as well, if desired. The advantages of this approach are significant.

For example, elimination of emulsifiers reduces or eliminates problems which are encountered in both in the dispersion and products made from the dispersion as a direct result of the emulsifiers being present. Examples of such problems are foaming, poor film formation, poor adhesion, poor water-resistance and support of bacterial growth (e.g., mold and mildew). Higher contents of water dispersability-enhancing compounds also leads to smaller particle sizes in the composite particles obtained, which facilitates better film formation and enhanced dispersability.

Regarding coalescents, many vinyl polymer aqueous dispersions especially those obtained by emulsion polymerization require coalescents to aid in film formation. Typical coalescents are volatile organic compounds such as organic esters, ethers and other low molecular weight compounds. Monobutylether of glycol, Texanol™ and Oxols™ are good examples. Conventional vinyl polymer aqueous dispersions can contain up to 10% or more of such compounds. In accordance with this aspect of the invention, such coalescents can be partially or totally eliminated, thereby providing product dispersions with a significantly lower VOC content.

(ii) Polymer Neutralization

In those instances in which the vinyl polymer includes water-dispersability enhancing compounds which produce pendant carboxylic or other acid groups, these groups can be converted to carboxylate or other anions for enhancing the water-dispersability of the prepolymer.

Suitable neutralizing agents for this purpose include ammonium hydroxide, metal hydroxides, amines, phosphines, and other agents well known to those skilled in the art. Ammonium hydroxide is preferred. Examples of useful amines include 2-amino-2-methyl-propanol-1 (AMP-95), ethylamine, diethylamine, triethyl amine, ethanolamine, diethanolamine, triethanolamine, dimethyl ethanolamine, N-methyl diethanolamine, methylamine, dimethylamine, trimethylamine, ethylene diamine, isophorone diamine, N-methyl morpholine, urotropin, DABCO, and the like, and mixtures thereof.

Additional Ingredients and Features

(i) Blends with Other Polymers and Polymer Dispersions

The dispersions of this invention can be combined with commercial polymers and polymer dispersions by methods well known to those skilled in the art. Such polymers and dispersions include those described in WIPO Publication WO 02/02657 A2, U.S. Pat. No. 4,920,176, U.S. Pat. No. 4,292,420, U.S. Pat. No. 6,020,438, U.S. Pat. No. 6,017,997, and a review article by D. P. Tate and T. W. Bethea, *Encyclopedia of Polymer Science and Engineering*, Vol. 2, p. 537, the disclosures of which are incorporated herein by reference.

Similarly, the dispersions of this invention can be formed by dispersing the nanoparticle/vinyl polymer bulk or solution polymerization reaction mass in a previously formed aqueous dispersion of another polymer or polymers and/or nanoparticles. In other words, the aqueous medium into which the bulk or solution polymerization reaction mass is dispersed in accordance with the present invention can itself be a previously formed aqueous dispersion of another polymer or polymers including those made by emulsion and suspension polymerization techniques and/or nanoparticles, dispersions or emulsions of other ingredients such as monomers, plasticizers, waxes, etc.

(ii) Hybrids with Other Polymers

The aqueous dispersions of this invention can also be used as seed polymers for forming hybrids of vinyl polymers with other polymers. This can be done by forming the aqueous dispersions of nanoparticle/vinyl polymer composite particles in the manner described above and then polymerizing additional monomers by emulsion polymerization in the presence of these dispersions, i.e., with the inventive dispersions being mixed with the additional monomers before polymerization is completed. Hybrids of different vinyl polymers can be made to advantage by this approach.

(iii) Plasticizers

The vinyl polymers of this invention can be prepared in the presence of a plasticizer. The plasticizer can be added at any time during polymer preparation or dispersion or after its manufacture. Plasticizers well known to the art can be selected for use in this invention according to parameters such as compatibility with the particular vinyl polymer and desired properties of the final composition.

(iv) Other Additives for Preparation of Dispersions

Other additives well known to those skilled in the art can be used to aid in preparation of the dispersions of this invention. Such additives include stabilizers, defoamers, antioxidants (e.g., Irganox™ 1010), UV absorbers, activators, curing agents, stabilizers such as carbodiimide, colorants, pigments, neutralizing agents, thickeners, non-reactive and reactive plasticizers, coalescing agents such as di(propylene glycol) methyl ether (DPM) and PM acetate, waxes, slip and release agents, antimicrobial agents, surfactants such as ionic and nonionic surfactants (e.g., Pluronic™ F68-LF, IGEPAL™ CO630) and silicone surfactants, metals, salts, flame retardant additives, antiozonants, and the like. They can optionally be added as appropriate before and/or during the processing of the dispersions of this invention into finished products as is well known to those skilled in the art. Additives may also be used as appropriate in order to make articles or to treat other products (such as by impregnation, saturation, spraying, coating, or the like). The dispersions of this invention typically have total solids of at least about 10 wt. % or 20 wt. %, preferably at least about 25 wt. % and more preferably at least about 30 wt. %.

Applications

Nanoparticles can impart several useful properties to polymers including abrasion, mar and scratch resistance, barrier properties, self-cleaning properties, flame retardance, chemical and stain resistance, higher tensile strength, catalytic, biocidal, magnetic, optical and electric propertied, UV stability, UV blocking and so forth.

The aqueous composite particle dispersions of the present invention can be used to make coatings and films for porous and non-porous substrates such as papers, non-woven materials, textiles, leather, wood, concrete, masonry, metals, house wrap and other building materials, fiberglass, polymeric articles, personal protective equipment and the like. Applications include papers and non-wovens; fibrous materials; films, sheets, composites, and other articles; inks and printing binders; flock and other adhesives; and personal care products such as skin care, hair care, and nail care products; livestock and seed applications; and the like.

Any fibrous material can be coated, impregnated or otherwise treated with the compositions of this invention by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon™), and the like.

The compositions of this invention can be used as adhesives or to augment or supplement adhesive types well known to those skilled in the art.

EXAMPLE

To illustrate the present invention, the following working example is provided.

To a three-necked flask submerged into a water bath and equipped with a stirrer, reflux condenser, thermometer and nitrogen inlet tube were added 55 grams isopropanol, 9.3 grams n-dodecyl mercaptan, 0.9 grams of a polymerization initiator (Vazo 67), 123 grams methyl methacrylate, 84 grams butyl acrylate, 13 grams methacrylic acid, and 6.6 grams NanOsil (nano silica from Energy Strategy Associates, weight-average particle size=50 nm). In a nitrogen atmosphere, the temperature of the vessel contents was brought to 70° C., and the reaction mixture was stirred at this temperature for 1 hour. Then the temperature was brought up to 80° C. and maintained for 40 minutes before increasing it further to 84° C. for 1 hour. To complete polymerization, a booster comprised of solution of 0.2 grams Vazo 67 in 1 gram isopropanol was added and reaction mixture was kept at 84° C. for another 1.5 hours. Acid was neutralized by gradual addition of 27 grams 18% aqueous ammonia.

The hot polymer solution so obtained was then dispersed into a solution of 6 grams 18% aqueous ammonia in 460 grams water which was pre-warmed to 70° C. to produce a dispersion of vinyl polymer/nanoparticle composites in water. This dispersion had the following properties:

| | |
|---|---|
| Total Solids | 30%, |
| pH | 9.2, |
| Brookfield viscosity | 360 cP, |
| Particle Size | 110 nm (PDI = 1.5). |

Test Methods

1. Brookfield Viscosity. Brookfield viscosity testing was performed using a Brookfield RV viscometer and spindles #3 to #6 (depending on viscosity) at 20 rpm and about 77° F.

2. Particle Size Measurements. The particle size and size distribution of the dispersions were obtained by Submicron Particle Sizer AutodilutePAT Model 370 (NICOMP Particle Sizing Systems) using an intensity average with Gaussian distribution.

3. Solids Content. Total solids were measured by Moisture/Solids Analyzer LabWare 9000™ (CEM Corporation).

4. pH Measurements. pH readings were taken using Acumet Basic pH Meter (Fisher Scientific).

Although, only a few embodiments of the invention have been described above, it should be appreciated that many modifications can be made without departing from the spirit and scope of the invention. All such modifications are intended to be included in the present invention, which is to be limited only by the following claims.

The invention claimed is:

1. A process for making an aqueous dispersion of nanoparticle/vinyl polymer composites comprising:
   (a) initiating polymerization of monomers by bulk or solution polymerization forming a reaction mass of monomer and/or polymer,
   (b) making a mixture of nanoparticles and polymer by adding nanoparticles to said reaction mass in which the vinyl polymer is formed after the vinyl polymer is at least 85% polymerized,
   (c) after said mixture of nanoparticles and polymer is made, dispersing said mixture of nanoparticles and polymer in water.

2. The process of claim 1, wherein said nanoparticles have a mean particle size by light scatter intensity measurements of less than 250 nm.

3. The process of claim 1, wherein said nanoparticles comprise silica, alumina, ceria, zinc oxide, clay, or mixtures thereof.

4. The process of claim 1, wherein said nanoparticles are present from about 0.05 to about 30 weight percent based on the combined weight of said nanoparticles and said polymer.

5. The process of claim 1, wherein the polymer contains sufficient water dispersability-enhancing compound so that the polymer will form a stable dispersion in water in the substantial absence of surfactant.

6. The process of claim 5, wherein the water dispersability-enhancing compound includes a carboxylic acid groups or an alkali metal, amine or ammonium salt thereof.

7. A process for making an aqueous dispersion of nanoparticle/vinyl polymer composites comprising:
   (a) initiating polymerization of the monomers forming the vinyl polymer by bulk or solution polymerization until conversion in the reaction mass of monomer to polymer is at least 20% complete prior to dispersing the reaction mass in water,
   (b) wherein the nanoparticles are added to said reaction mass in which the vinyl polymer is formed prior to dispersing the reaction mass in water,
   (c) wherein said reaction mass and said nanoparticles are dispersed in water after steps (a) and (b), and
   (d) wherein said vinyl polymer has incorporated therein a reactive compound bearing at least one hydrophilic group or a group that can be made hydrophilic in an amount of at least 2 wt. % based on the weight of the vinyl polymer and in a sufficient amount that said polymer will form a stable dispersion in water in the substantial absence of surfactant, thereby forming water-dispersability enhancing compound within said vinyl polymer, wherein the water dispersability-enhancing compound includes alkylene oxide groups containing 1 to 6 carbon atoms.

8. The process of claim 7, further comprising a step of polymerizing one or more additional monomers onto the dispersion of polymer and water after said step of dispersing said vinyl polymer and nanoparticles in water.

\* \* \* \* \*